(12) United States Patent
Xue et al.

(10) Patent No.: US 8,503,981 B1
(45) Date of Patent: Aug. 6, 2013

(54) DATA SERVICE UPGRADE WITH ADVICE OF CHARGE

(75) Inventors: Wen Xue, Overland Park, KS (US);
Raymond E. Reeves, Olathe, KS (US);
Ryan A. Wick, Apollo Beach, FL (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 13/289,711

(22) Filed: Nov. 4, 2011

(51) Int. Cl.
*H04M 1/66* (2006.01)
*H04L 29/06* (2006.01)
*G06F 3/00* (2006.01)
*G06F 3/048* (2006.01)
*G06F 15/173* (2006.01)

(52) U.S. Cl.
USPC .......... 455/411; 726/4; 726/7; 715/741; 715/752; 715/772; 709/226

(58) Field of Classification Search
USPC .......................................... 455/411
See application file for complete search history.

(56) References Cited

U.S. PATENT DOCUMENTS

| | | | |
|---|---|---|---|
| 7,565,141 B2 | 7/2009 | Macaluso | |
| 2006/0089122 A1* | 4/2006 | Zavalkovsky et al. | 455/410 |
| 2006/0206709 A1 | 9/2006 | Labrou et al. | |
| 2007/0113269 A1 | 5/2007 | Zhang | |
| 2008/0020738 A1 | 1/2008 | Ho et al. | |
| 2008/0065719 A1* | 3/2008 | Wilson | 709/203 |
| 2008/0222707 A1* | 9/2008 | Pathuri et al. | 726/4 |
| 2008/0256458 A1* | 10/2008 | Aldred et al. | 715/741 |
| 2011/0208864 A1* | 8/2011 | St. Laurent et al. | 709/226 |
| 2011/0302643 A1* | 12/2011 | Pichna et al. | 726/7 |

* cited by examiner

*Primary Examiner* — Patrick N. Edouard
*Assistant Examiner* — Timothy Pham

(57) ABSTRACT

A method of providing network access notification is provided. The method can include receiving an identification for a wireless device at an access gateway and determining that the wireless device is not authorized to access a communication network based on the received identification. The method can further include sending a rejection notification to a messaging node indicating that the wireless device is not authorized to access the communication network and sending an access notification from the messaging node to an authorization device when the rejection notification is received at the messaging node. The access notification can include network access information to enable the wireless device to access the communication network. The authorization device is determined based on the identification. The method can also include receiving a response from the authorization device based on the network access information, and enabling access from the wireless device to the communication network.

8 Claims, 7 Drawing Sheets

DATA SERVICE UPGRADE WITH ADVICE OF CHARGE

TECHNICAL BACKGROUND

Presently, wireless communication systems have become an important way by which people have come to communicate. A wireless communication system may provide communication for a plurality of wireless devices. As wireless communication use has expanded, many wireless devices are designed to perform tasks beyond voice communications, such as Internet browsing, email communication, etc. However, additional wireless services typically have additional costs associated with each of the available services.

Subscribers of wireless services may often have access to one type of wireless service, such as voice communications, but wish to utilize another type of wireless service, such as Internet browsing. While subscribers may update their accounts to increase the ability to use these additional services, some subscribers may wish to access the additional services on a by-use basis. Thus, instead of upgrading their monthly service plan, the subscribers may merely wish to browse the Internet for a limited amount of time, or access a limited amount of data.

Therefore, in order to expand services to use these additional services, and more specifically for a limited duration, subscribers need an easy way to access services such as Internet browsing.

OVERVIEW

In accordance with at least one example, a method of providing network access notification is provided. The method comprises receiving an identification for a first wireless device at an access gateway and determining that the first wireless device is not authorized to access a communication network based on the received wireless device identification. The method further comprises sending a rejection notification to a messaging node indicating that the first wireless device is not authorized to access the communication network. The method additionally comprises sending an access notification from the messaging node to an authorization device when the rejection notification is received at the messaging node. The access notification comprises network access information to enable the first wireless device to access the communication network. The authorization device is determined based on the wireless device identification. The method also comprises receiving a response from the authorization device based on the network access information, and enabling access from the first wireless device to the communication network when the response to the access notification is received from the authorization device.

In accordance with another example, an authorization system is provided comprising an access gateway receiving an identification for a first wireless device and determining that the first wireless device is not authorized to access a communication network based on the received wireless device information, and a messaging node sending an access notification to a wireless authorization device determined based on the wireless device identification after receiving a rejection notification indicating that the first wireless device is not authorized to access the communication network, the notification comprising network access information to enable the wireless device to access the communication network.

In accordance with yet another example, a method of providing network access notification is provided. The method comprises receiving an identification for a wireless device at an access gateway and determining that the wireless device is not authorized to access a communication network based on the received wireless device identification. The method also comprises sending a rejection notification to a messaging node indicating that the wireless device is not authorized to access the communication network. The method additionally comprises sending an access notification from the messaging node to the wireless device determined based on the wireless device identification, the access notification comprising network access information to enable the first wireless device to access the communication network.

DETAILED DESCRIPTION

Figure 1:
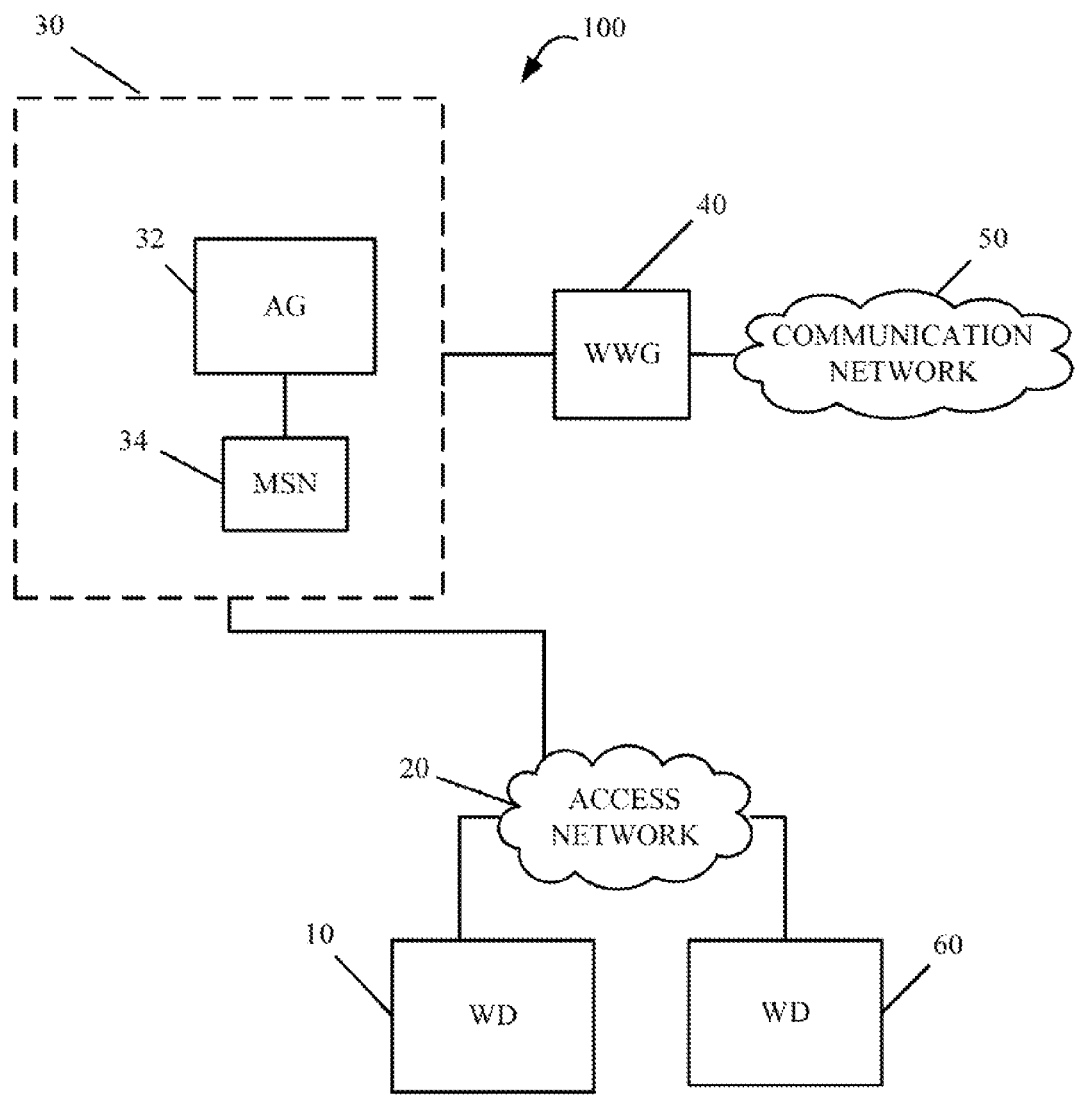
FIG. 1 includes a schematic diagram of an exemplary embodiment of the present teachings.

FIG. 1 is a schematic diagram illustrating an exemplary embodiment of the present teachings. The schematic diagram illustrates communication system 100. Communication system 100 includes authorization node 30, comprising access gateway (AG) 32 and messaging node (MSN) 34 in communication with AG 32. Communication system 100 additionally includes wireless web gateway (WWG) 40 controlling access to communication network 50. Authorization node 30 communicates with WWG 40 and provides information to WWG 40 to allow for connection to communication network 50. Communication system 100 may include a number of wireless devices, such as first wireless device 10 and second wireless device 60. Wireless devices 10 and 60 communicate with access network 20, which may provide access to communication network 50. Access network 20 communicates with authorization node 30 and provides access from wireless devices 10 and 60 to communication network 50 through access network 20.

Other network elements may be present in the communication system to facilitate wireless communication but are omitted for clarity, such as base stations, base station controllers, gateways, mobile switching centers, dispatch application processors, and location registers, such as a home location register or visitor location register. Other network elements may also be present to facilitate communication between access network 20, authorization node 30, WWG 40, communication network 50, and first wireless device 10 and second wireless device 60, which are omitted for clarity, including additional processing nodes, routers, gateways, and physical and/or wireless data links for carrying data among the various network elements.

First and second wireless devices 10 and 60 may be, for example, cellular phones, personal digital assistants (PDAs), handheld devices, wireless modems, laptop computers, personal computers, or any other type of device that provides for wireless communication over an air interface. Wireless devices 10 and 60 can execute applications (not illustrated) which send and/or receive data via access network 20.

Wireless devices 10 and 60 and access network 20 each communicate over wired or wireless communication links or combinations thereof. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

When a user wishes to add an additional service other than voice communication, such as data communication over communication network 50, i.e., the Internet, for example, the user attempts to access communication network 50 from first wireless device 10. In the access attempt, identification information for first wireless device 10 is transmitted to authorization node 30. Authorization node 30 determines whether first wireless device 30 is authorized to access communication network 50. If a determination is made that first wireless device 10 is not authorized to access communication network 50, then a message is transmitted to a device that is authorized to grant permission for first wireless device 10 to access communication network 50.

The message that is transmitted to the authorization device allows the authorized subscriber to select a plan for access to communication network 50, such as the Internet, for first wireless device 10. The message is different depending on whether the authorization device is browser-enabled or not.

If the authorization device is browser-enabled, then the message includes access information that allows the authorization device to respond through the browser. If the authorization device is not browser-enabled, then the message includes access information that allows the authorization device to respond through a message, such as an SMS message. In addition to the access information, advice of charge information, which indicates the costs associated with specific access plans prior to accessing the communication network, may be provided in the message transmitted to the authorization device.

Thereafter, the subscriber at the authorization device responds to the message by selecting a plan to allow access to the additional service. After a service plan has been selected either through the browser or by transmitting a message, such as an SMS message, to a service provider, then first wireless device 10 is authorized to access communication network 50.

Figure 2:
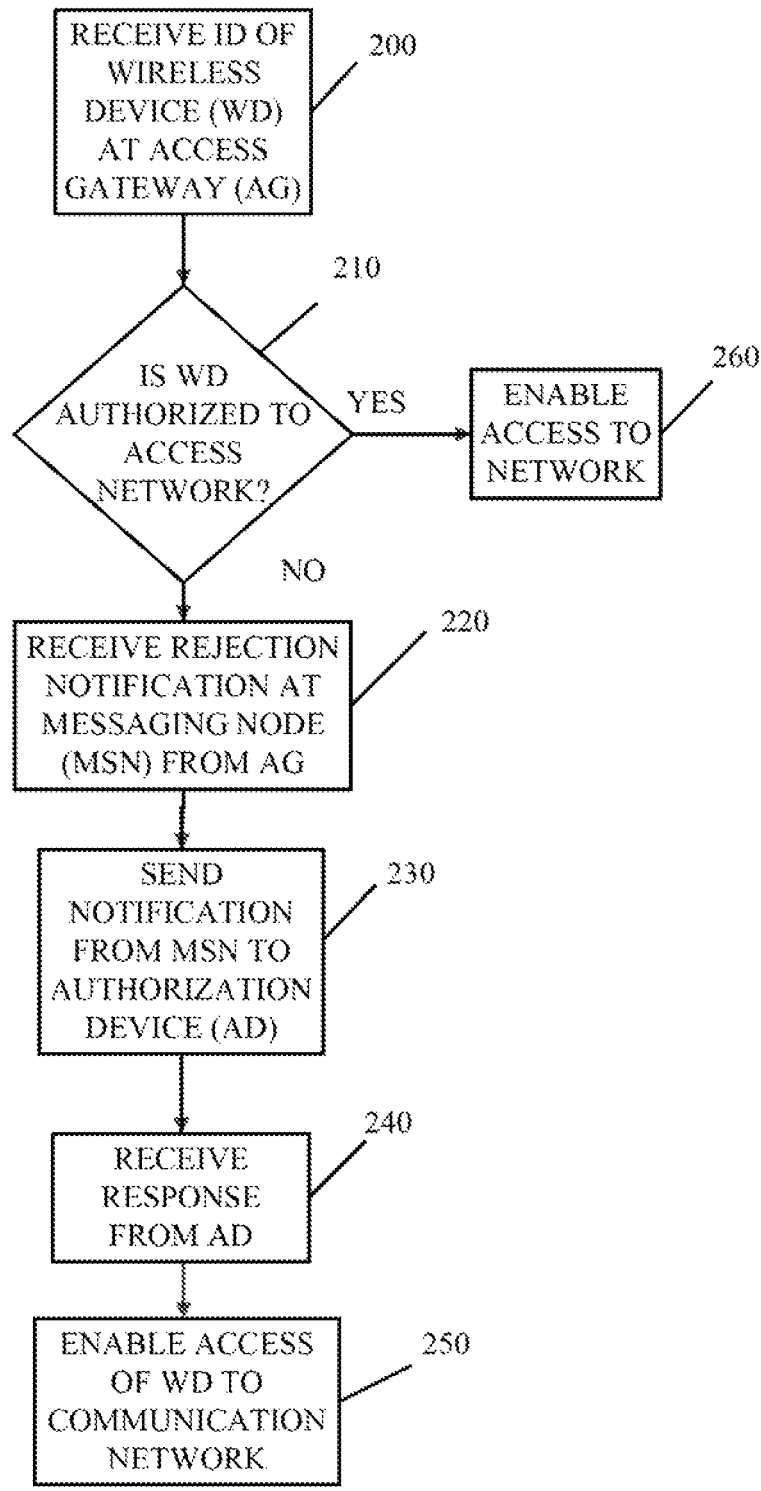
FIG. 2 includes a flowchart illustrating a method of an exemplary embodiment of the present teachings.

FIG. 2 is a flowchart illustrating a method of an exemplary embodiment of the present teachings. In at least one embodiment, first wireless device 10 attempts access to communication network 50. An identification, such as a specific device code, for first wireless device 10 is received at AG 32 (operation 200). As will be discussed in more detail below, AG 32 thereafter determines whether first wireless device 10 is authorized to access communication network 50 based on the received identification (operation 210). When AG 32 determines that first wireless device 10 is authorized to access communication network 50, access to communication network 50 is enabled (operation 260).

When AG 32 determines that first wireless device 10 is not authorized to access communication network 50, AG 32 sends a rejection notification to MSN 34, indicating that first wireless device 10 is not authorized to access communication network 50 (operation 220). The rejection notification is a failed user access attempt. Upon receipt of the rejection notification, MSN 34 sends an access notification, which includes network access information to enable first wireless device 10 to access communication network 50, to an authorization device determined based on the wireless device identification (operation 230).

The access notification includes network access information to enable first wireless device 10 to access communication network 50. The authorization device that has received the access notification responds to the access notification, and the response from the authorization device is received at authorization node 30 (operation 240). Thereafter, when the response to the access notification is received from the authorization device, access from first wireless device 10 to communication network 50 is enabled (operation 250).

Figure 3:
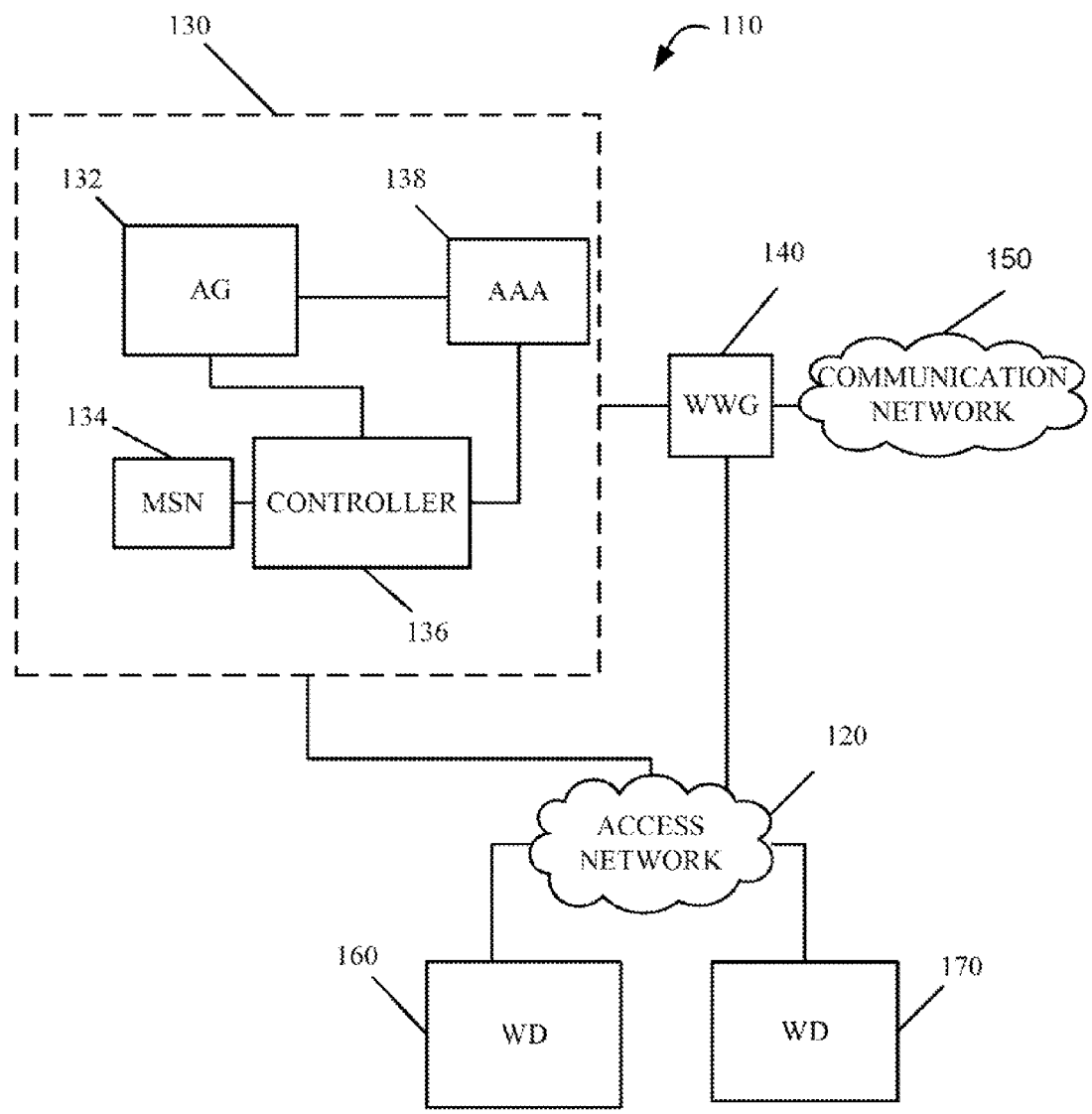
FIG. 3 includes a detailed schematic diagram of an exemplary embodiment of the present teachings.

FIG. 3 is a schematic diagram of an exemplary embodiment of the present teachings. Communication system 110 includes authorization node 130, comprising access gateway (AG) 132 and messaging node (MSN) 134 in communication with AG 132. Communication system 110 additionally includes wireless web gateway (WWG) 140 controlling access to communication network 150. Authorization node 130 communicates with WWG 140 and provides information to WWG 140 to allow for connection to communication network 150. Communication system 110 may include a number of wireless devices, such as first wireless device 160 and second wireless device 170. Wireless devices 160 and 170 communicate with access network 120, which may provide access to communication network 150. Access network 120 communicates with authorization node 130 and provides access from wireless devices 160 and 170 to communication network 150 through access network 120. In addition, authorization node 130 includes controller 136 and authentication, authorization and accounting (AAA) node 138. Controller 136 communicates with MSN 134, AG 132 and AAA node 138. AAA node 138 communicates with AG 132 and controller 136. MSN 134 communicates with AG 132 through controller 136.

Figure 4:
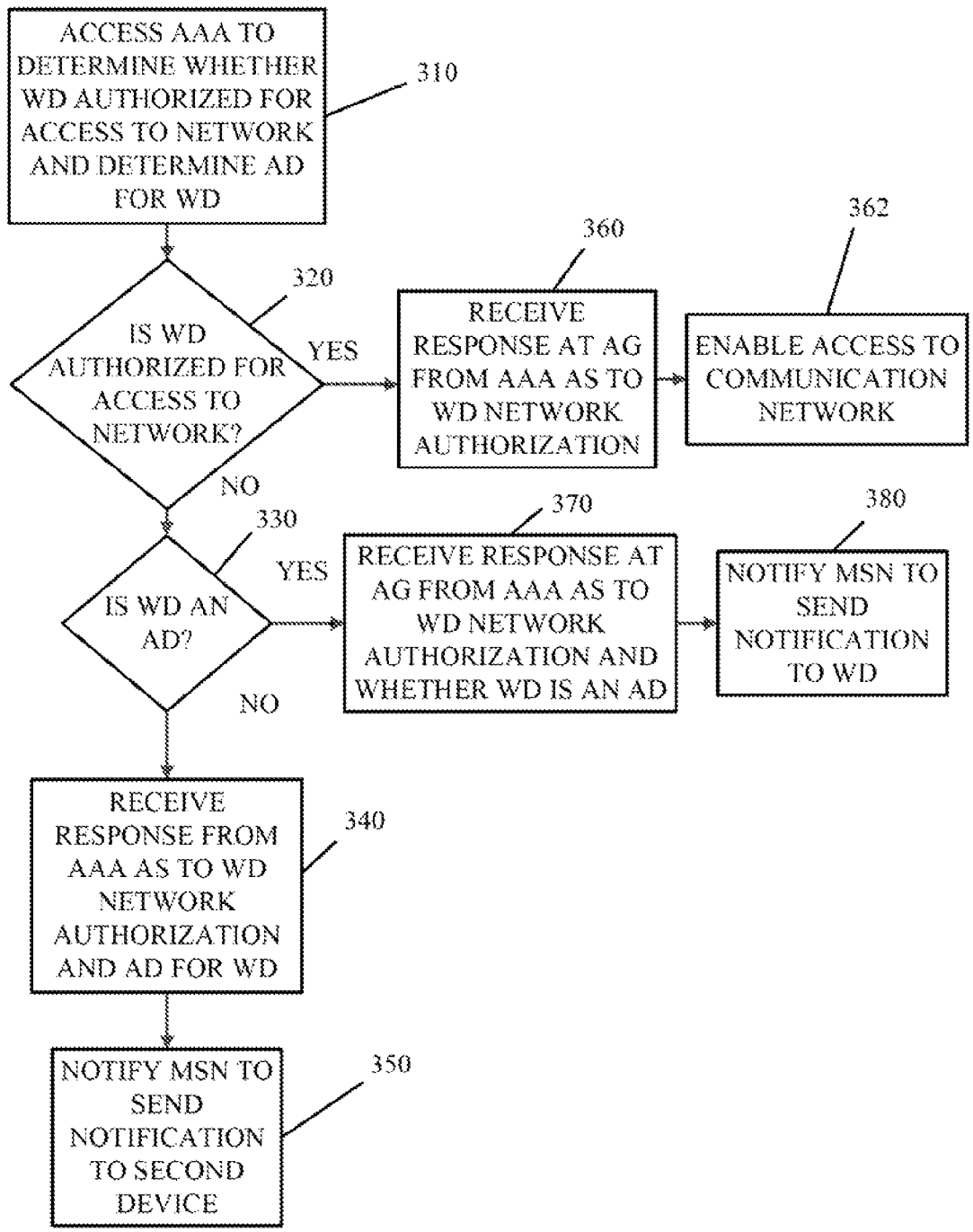
FIG. 4 includes a flowchart illustrating the method of the exemplary embodiment of the present teachings.

FIG. 4 is a flowchart illustrating the method of the exemplary embodiment of the present teachings. After AG 132 receives an identification for first wireless device 160 from first wireless device 160 upon a communication network access attempt, AG 132 determines, based on the received wireless device identification from first wireless device 160 whether first wireless device 160 is authorized to access communication network 150 (operation 310). To make the authorization determination, AG 132 accesses AAA node 138. AAA node 138 may include a storage unit having a look-up table, for example, or alternatively may access a storage device that stores identification information for a plurality of wireless devices and associated information that is associated with the identification information. AAA node 138 determines the information that is associated with the identification information and uses this information to determine whether first wireless device 160 is authorized to access communication network 150.

The first wireless device identification may be used to determine the subscriber account, the subscriber contact, the device type and the mobile number, for example, associated with the first wireless device identification. In addition, AAA node 138 uses the first wireless device identification to determine the authorization devices associated with the wireless device identification (operation 310). For example, first wireless device 160 may be an authorization device. Alternatively, second wireless device 170, which may be a parent's wireless device, may be associated with the identification for first wireless device 160, which may be a child's wireless device.

In an exemplary embodiment, if first wireless device 160 is typically used by an individual, such as a child, who does not control the account for first wireless device 160, then first wireless device 160 may be associated with another device, such as second wireless device 170, for example, registered to the child's parent (e.g., a registered responsible party for first wireless device 160). Thus, the access notification is transmitted to the device that is authorized for the account—either to first wireless device 160 if first wireless device 160 is registered as an authorized device for the account or to second wireless device 170 if first wireless device 160 is not registered as an authorized device for the account and if second wireless device 170 is registered as an authorized device for the account.

Figure 5:
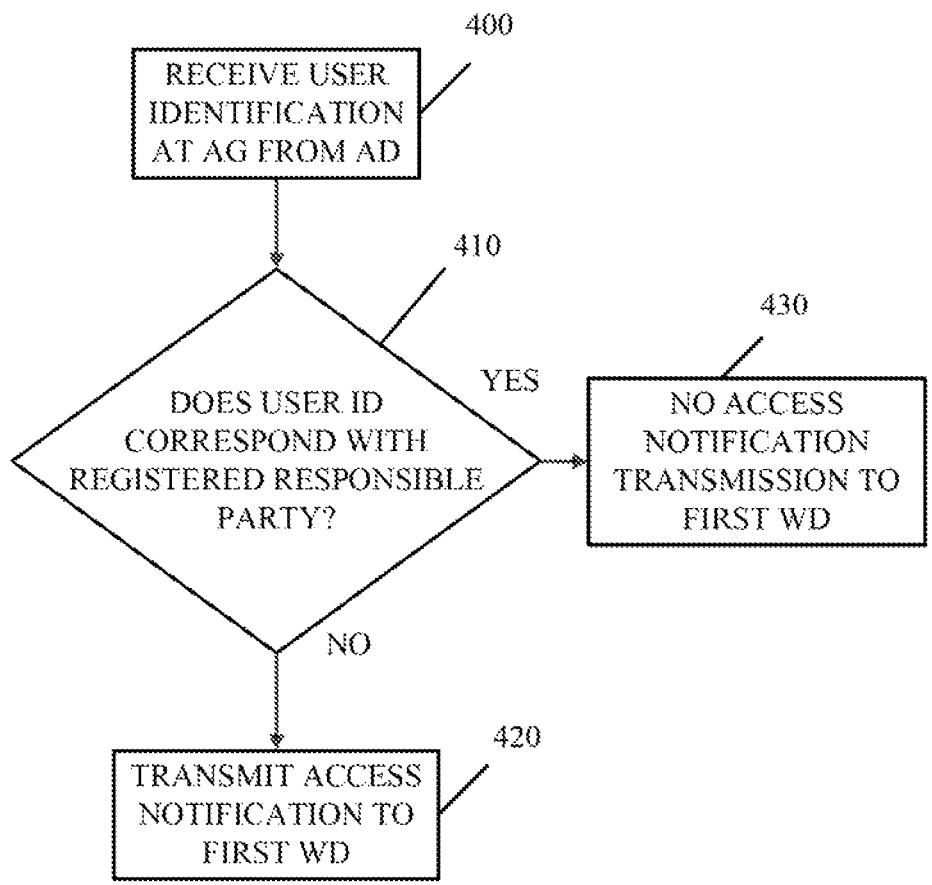
FIG. 5 includes a flowchart illustrating the method of the exemplary embodiment of the present teachings.

In addition, as shown in FIG. 5, which is a flowchart illustrating the method of the exemplary embodiment of the present teachings, an additional security measure may be provided, in which AG 132 receives a user identification from the authorization device—either first wireless device 160 or second wireless device 170 (operation 400). Then, AG 132 determines, by accessing AAA node 138, which refers to a look-up table or a storage device, for example, whether the user identification corresponds with a registered responsible party for first wireless device 10 (operation 410). The access notification is transmitted to first wireless device 160 when the user identification is determined to be one of the registered responsible parties of first wireless device 160 (operation 420). For example, if the user identification from first wireless device 160 corresponds with the child, who is not a registered responsible party for first wireless device 160, then the access notification is not transmitted to first wireless device 160 (operation 430). If the user identification from first wireless device 160 corresponds with the parent, who is a registered responsible party for first wireless device 160, then the access notification is transmitted to first wireless device 160.

Referring back to FIG. 4, AAA node 138 determines whether first wireless device 160 is authorized for access to communication network 150 (operation 320). When AAA node 138 determines that first wireless device 160 is authorized for access to communication network 150, AAA node 138 notifies controller 136, which communicates with AG 132 that first wireless device 160 is authorized for access to communication network 150 (operation 360). AG 132 then enables access for first wireless device 160 to communication network 150 through WWG 140 (operation 362).

When AAA node 138 determines that first wireless device 160 is not authorized for access to communication network 150, AAA node 138 determines, based on the first wireless device identification, whether first wireless device 160 is an authorization device for the account associated with the first wireless device identification (operation 330). When AAA node 138 determines that first wireless device 160 is an authorization device for the account, AAA node 138 provides the information to AG 132 (operation 370), which provides the information that first wireless device 160 is an authorization device for the account and a rejection notification, which is a failed user access attempt notification, to controller 136. Therefore, MSN 134 is notified by controller 136 to transmit an access notification to the device that is authorized for the account associated with first wireless device 160 after controller 136 receives the rejection notification. In this case, MSN 134 is notified by controller 136 to transmit the access notification to first wireless device 160. The access notification includes network access information to enable first wireless device 160 to access communication network 150. The access notification may be, for example, an SMS message, and includes different network access information depending on whether the authorization device is browser-enabled or not browser-enabled.

When AAA node 138 determines that first wireless device 160 is not an authorization device for the account, AAA node 138 provides the information to AG 132 (operation 340), which provides the information that first wireless device 160 is not an authorization device for the account associated with first wireless device 160 and a rejection notification, which is a failed user access attempt notification, to controller 136. Thereafter, MSN 134 is notified by controller 136 to transmit an access notification to the device that is authorized for the account associated with first wireless device 160, e.g., second wireless device 170 (operation 350). The access notification includes network access information to permit second wireless device 170 to enable first wireless device 160 to access communication network 150.

Figure 6:
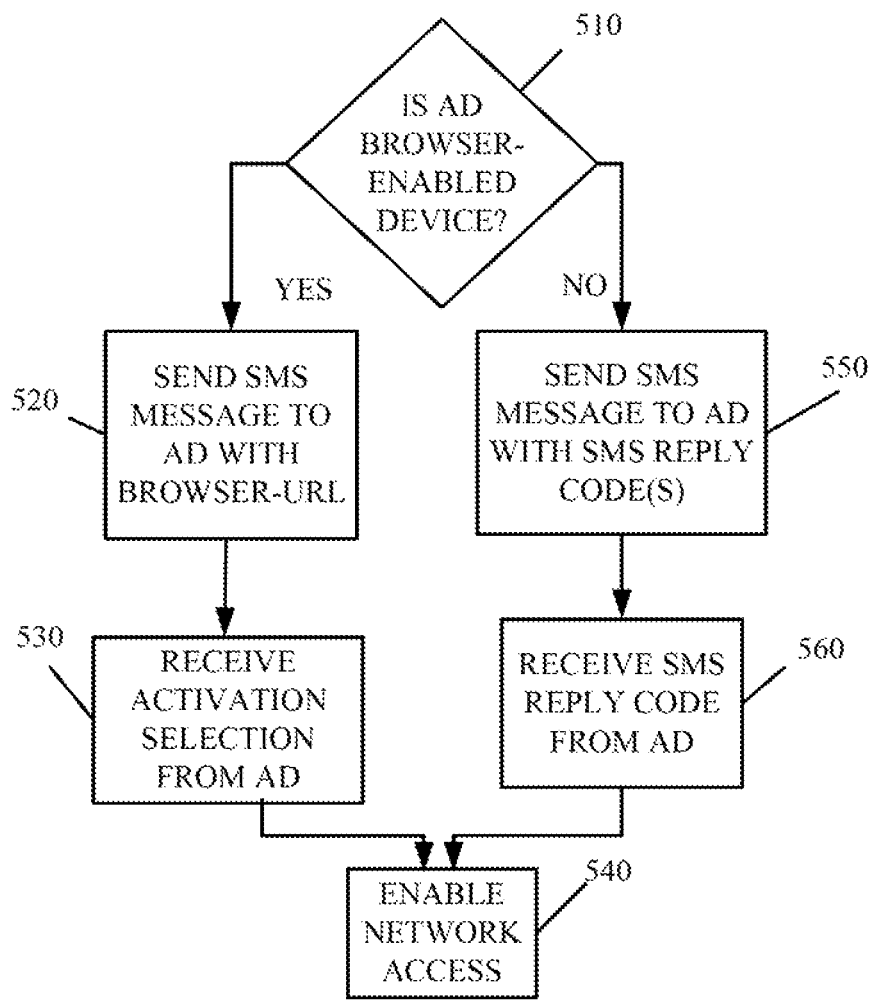
FIG. 6 includes a flowchart illustrating the method of the exemplary embodiment of the present teachings.

Turning now to FIG. 6, which is a flowchart illustrating the method of the exemplary embodiment of the present teachings, when controller 136 receives information from AAA node 138 as to the subscriber account, which may include information about the device type of the authorization device, controller 136 determines whether the authorization device is a browser-enabled device (operation 510).

When the authorization device, which may be first wireless device 160 or second wireless device 170, is browser-enabled, e.g., a handset, controller 136 notifies MSN 134 to transmit a message, such as an SMS message, to the authorization device with a browser-URL (operation 520). The SMS message transmitted to the authorization device is a service-initiation notification with the URL where additional offer details exist. After the SMS message is received at the authorization device, the application management system at the authorization device detects that the SMS message includes a browser-URL and launches the browser. Upon navigating through WWG 140 with the designated URL, the user is presented only with a list of available data service plan options, e.g., a one-day pass, etc. and all attempts from the user to navigate to other pages result in getting routed back to the data service plan options page. When the user at the authorization device selects a service plan, WWG 140 transmits the activation selection to controller 136, which in turn notifies AAA node 138 about the activation selection (operation 530). After a service plan is selected, the user is presented with a page of details regarding the activated service plan, as well as cost and duration of the service plan. As controller 136 informs AAA node 138 about the service plan selection, controller 136 clears the restrictions at AG 132 for first wireless device 160 so that first wireless device 160 may access communication network 150 unless and until new restrictions are placed. e.g., when the duration of the plan expires (operation 540).

When the authorization device, which may be first wireless device 160 or second wireless device 170, is not browser-enabled, i.e., the device utilizes an embedded device such as a data card, controller 136 notifies MSN 134 to transmit an SMS message to the authorization device with activation information (operation 550). For example, the SMS message transmitted to the authorization device may indicate that data access is restricted and may provide a list of service plans available, e.g., a one-day pass and activation information, such as an SMS reply word. For example, the reply word may be a specific word, e.g., "DAY-PASS", that is sent to a reply short-code, e.g, "XYZ", where the specific word is connected with one of the service plans that indicates that the user wishes to select a specific access plan. When the user at the authorization device sends the reply word in a response (operation 560), MSN 134 routes the response to controller 136, which notifies AAA node 138 about the plan selection. At the same time, controller 136 clears the restrictions at AG 132 for first wireless device 160 so that first wireless device 160 may access communication network 150 unless and until new restrictions are placed (operation 540). In addition, upon notifying AAA node 138 about the plan selection, controller 136 notifies MSN 134 to transmit a follow-up SMS message to the authorization device, which may be first wireless device 160 or second wireless device 170, informing the user of the authorization device for first wireless device 160 that the service has been activated, the cost of the service plan and the duration of the plan (operation 570).

Figure 7:
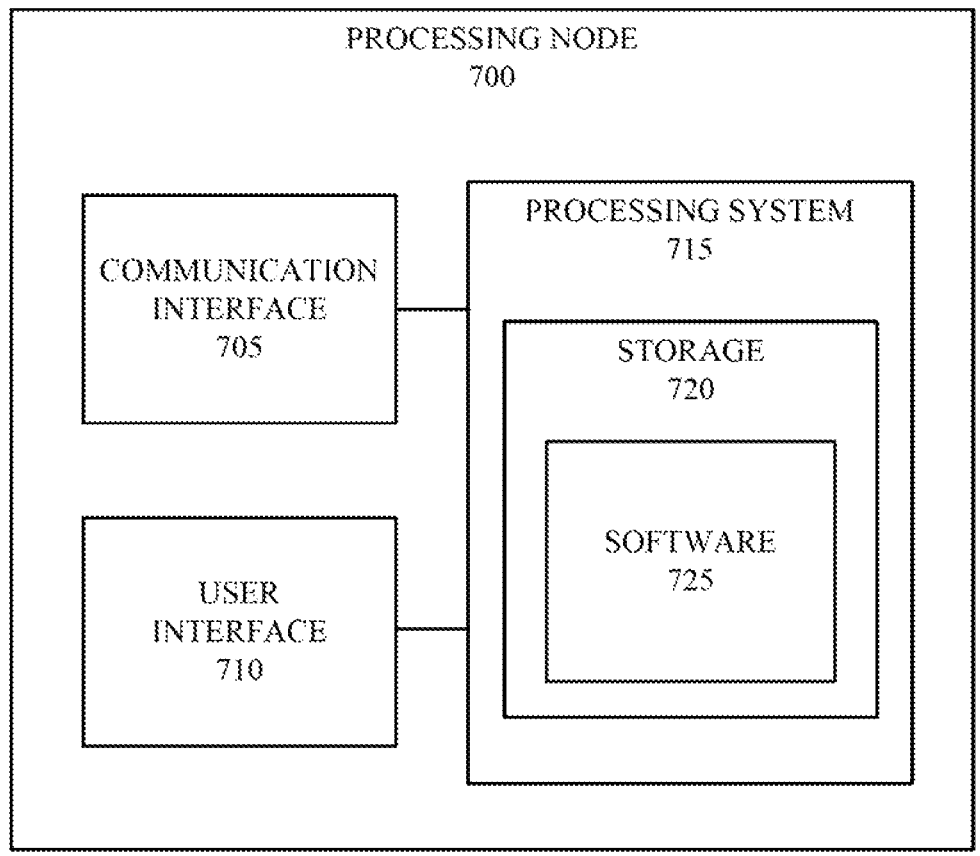
FIG. 7 illustrates an exemplary processing node of an exemplary embodiment of the present teachings.

FIG. 7 illustrates an exemplary processing node 700. Processing node 700 can be, for example, an access node or a gateway, or a component thereof, or it can be another network element (or a component of another network element) of a communication system. Processing node 700 can include communication interface 705 and user interface 710, each in communication with a processing system 715. Processing node 700 can communicate with other network elements, including mobile stations and other processing nodes, over a wired and/or wireless communication link through the communication interface 705.

Processing system 715 can include storage 720. Storage 720 comprises a disk drive, flash drive, memory circuitry, or other memory device. Storage 720 can store software 725 which is used in the operation of the processing node 700. Software 725 may include an operating system, utilities, drivers, network interfaces, applications, or some other type of software. Processing node 700 can also include user interface 710 to permit a user to configure and control the operation of the processing node 700.

Some or all of the actions performed by the exemplary embodiments described herein can be performed under the control of a computer system executing computer-readable codes either in a computer-readable recording medium or in communication signals transmitted through a transmission medium. The computer-readable recording medium is any data storage device that can store data for a non-fleeting period of time such that the data can thereafter be read by a computer system. Examples of the computer-readable recording medium include, but are not limited to, read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. The communication signals transmitted through a transmission medium may include, for example, signals which modulate carrier waves transmitted through wired or wireless transmission paths.

It is to be understood that both the general description and the detailed description are exemplary and explanatory only and are not restrictive of the present invention, as claimed. Those skilled in the art will appreciate that the features described can be combined in various ways to form multiple variations of the invention. Other embodiments will be apparent to those skilled in the art from consideration of the specification and practice of the teachings disclosed herein. As a result, the invention is not limited to the specific examples described above, but only by the claims and their equivalents.

What is claimed is:

1. A method of providing network access notification, comprising:

receiving a request to access a communication network from a wireless device at an access gateway, wherein the request comprises an identification of the wireless device;

determining whether the wireless device is authorized to access the communication network based on the identification received from the wireless device;

determining an authorization device associated with the wireless device based on the identification of the wireless device when the wireless device is not authorized to access the communication network;

determining whether the authorization device associated with the wireless device is a browser-enabled device or a non-browser-enabled device when the wireless device is not authorized to access the communication network;

sending a rejection notification to a messaging node when the wireless device is not authorized to access the communication network;

sending an access notification from the messaging node to the authorization device associated with the wireless device when the rejection notification is received at the messaging node, the access notification comprising network access information to allow a user of the authorization device to select a plan to allow the wireless device to access the communication network, wherein the access notification further comprises access information that allows the authorization device to respond through a browser when the authorization device is browser-enabled and the access notification includes access information that allows the authorization device to respond by transmitting a message through the messaging node when the authorization device is non-browser-enabled;

receiving a response from the authorization device based on the plan selected to allow the wireless device access to the communication network;

enabling the wireless device to access the communication network when the response to the access notification is received from the authorization device by clearing network access restrictions associated with the wireless device; and transmitting a message indicating that access to the communication network has been granted to the wireless device.

2. The method according to claim 1, further comprising sending a service activation notification to the wireless device indicating at least one of service activation, cost of selected service plan and duration of service determined based on the received response from the authorization device.

3. The method according to claim 1, further comprising determining that the authorization device is a second wireless device based on the received wireless device identification.

4. The method according to claim 1, further comprising:

receiving a user identification from the authorization device;

determining that the user identification received from the wireless device is one of at least one registered responsible party of the wireless device; and sending the access notification to the wireless device when the user identification is determined to be one of the at least one registered responsible party of the wireless device.

5. The method according to claim 1, wherein the receiving the response from the authorization device based on the plan selected to allow the wireless device access to the communication network comprises receiving a response specific to a selected activation plan.

6. The method according to claim 1, wherein the access notification is a Short Message Service (SMS) message when the authorization device is non-browser enabled.

7. An authorization system, comprising:

an access gateway configured to receive a request to access a communication network from a wireless device, where the request comprises an identification of the wireless device;

an authorization node configured to determine whether the wireless device is authorized to access the communication network based on the identification received from the wireless device, the authorization node further configured to determine an authorization device associated with the wireless device based on the identification of the wireless device and determine whether the authorization device is associated with the wireless device is a browser-enabled device or a non-browser-enabled device when the wireless device is not authorized to access the communication network;

a controller node configured to receive a rejection notification from the access gateway when the wireless device is not authorized to access the communication network; and a messaging node configured to receive a notification from the controller node indicative of the rejection notification and send an access notification to the authorized device associated with the wireless device when the notification indicative of the rejection notification is received, the access notification comprising network access information to allow a user of the authorization device to select a plan to allow the wireless device to access the communication network, wherein the access notification further comprises access information that allows the authorization device to respond through a browser when the authorization device is browser-enabled and the access notification includes access information that allows the authorization device to respond by transmitting a message through the messaging node when the authorization device is non-browser-enabled, the messaging node is further configured to receive a response from the authorization device associated with the wireless device based on the plan selected to allow the wireless device access to the communication network, wherein the controller clears network access restrictions associated with the wireless device to enable the wireless device to access the communication network after the messaging node receives the response from the authorization device associated with the wireless device and notifies the messaging node to transmit a message indicating that access to the communication network has been granted to the wireless device.

8. The authorization system according to claim 7, wherein the messaging node routes the response from the authorization device associated with the wireless device to the controller node and the controller node notifies the authorization node about a service plan selection when the response is received at the controller node.

* * * * *